(No Model.)
F. B. MUELLER.
ROLLER SKATE.
No. 308,089. Patented Nov. 18, 1884.
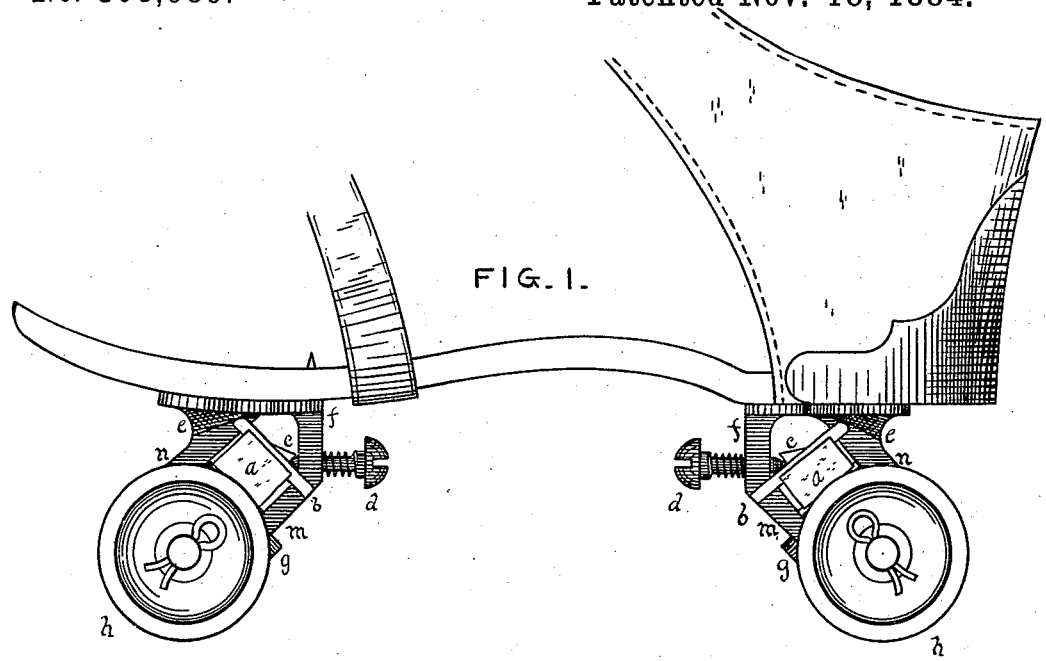
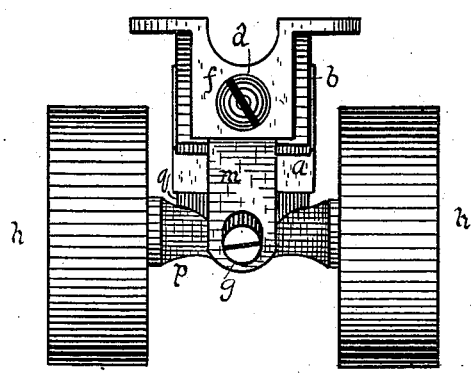
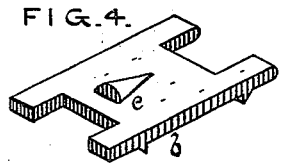
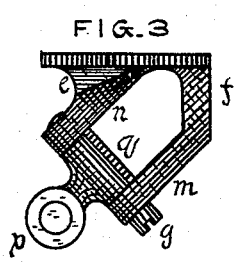
Witnesses.
O. B. Sparks
C. H. Walters
Inventor.
FRED B. MUELLER.
By L. P. Graham
atty.

UNITED STATES PATENT OFFICE.

FRED B. MUELLER, OF DECATUR, ILLINOIS.

ROLLER-SKATE.

SPECIFICATION forming part of Letters Patent No. 308,089, dated November 18, 1884.

Application filed March 6, 1884. (No model.)

*To all whom it may concern:*

Be it known that I, FRED B. MUELLER, a resident of the city of Decatur, county of Macon, and State of Illinois, have invented certain new and useful Improvements in Roller-Skates, of which the following is a specification.

In the drawings accompanying and forming a part of this specification, Figure 1 is a side elevation of my complete skate. Fig. 2 is a rear elevation of the front truck. Fig. 3 is a side elevation of a truck-frame, and Fig. 4 is a perspective view of the plate used to compress the spring.

$a$ is the spring, made preferably of rubber or some corresponding elastic substance.

$b$ is the plate used to compress the spring $a$.

$c$ is a projection on plate $b$, against which the adjusting-screw exerts its force.

$d$ is the adjusting-screw, located as indicated in frame $f$.

$e$ shows inclined surfaces against which the ends of plates $b$ operate.

As shown in Fig. 3, the truck-frame is composed of parts $f$, $m$, and $n$, in which axle $p$ is pivoted by means of screw or bolt $g$. The upper portion of the axle-pivot expands into platform $q$, on which spring $a$ rests.

$h$ $h$ are the wheels, loosely mounted on axles $p$.

By first placing plate $b$ in position, following with the spring, and securing the whole by inserting screw $g$ through pivot $q$, the truck may be readily put together.

To adjust the pressure of the spring, screw $d$ is driven or drawn, as the case requires.

The effect of the pressure of screw $d$ on plate $b$ is as follows: The force of the screw is exerted through the plate against the inclines $e$. As the pressure is increased the force compels the ends of the plate to ascend the inclines and the entire plate to approach the platform $q$ in a position parallel thereto.

By the use of the above-described arrangement pressure is imparted uniformly to all parts of the spring, which is thereby correspondingly strengthened.

I claim as new and desire to secure by Letters Patent—

The combination of plate $b$, projection $c$, screw $d$, and inclined planes $e$, as and for the purpose set forth.

FRED B. MUELLER.

Attest:
L. P. GRAHAM,
I. D. WALKER.